April 11, 1950     R. Y. GRANT, JR     2,503,818
ANIMATED WHISTLE
Filed Nov. 20, 1947

INVENTOR.
ROBERT Y. GRANT, JR.
BY Chas. R. Fay, atty.

Patented Apr. 11, 1950

2,503,818

UNITED STATES PATENT OFFICE 2,503,818

ANIMATED WHISTLE

Robert Y. Grant, Jr., Townsend, Mass.

Application November 20, 1947, Serial No. 787,221

1 Claim. (Cl. 46—118)

This invention relates to an animated whistle or other sound instrument which is made in the form of a hollow bird having a head and a tail, there being a wind or breath inlet hole in the tail for the purpose of creating a sound, the body having a pair of opposite exit holes for the air and there being pivotally disposed above each hole a wing element which depends by its own weight down to cover the exit to be raised by the breath and to fall when the breath fails.

It is the object of this invention to provide an animated whistle of the above described characteristics so as to produce wind-like flapping motion when the whistle is blown, said flapping motion being due entirely to the breath being blown to create the whistle sound.

Other objects and advantages of the invention will appear hereinafter.

Reference is to be had to the accompanying drawing in which

Figure 1:
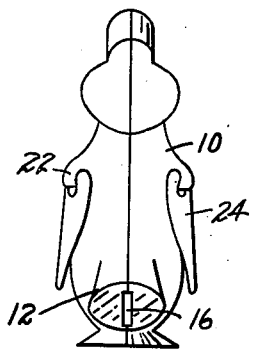
Fig. 1 is a view in rear elevation of a form of the invention.

This invention contemplates the use of a hollow body in the form of a bird such as a duck, this hollow body being generally indicated at 10. The hollow body is provided with a tail 12 and a head 14, the tail having an inlet hole 16 whereby the breath may be blown thereinto to produce a whistle sound. The figure may stand on its own feet as at 18.

It is to be understood that the body is completely hollow and at each side thereof it is provided with a breath exit hole 20 intermediate the tail and the head. Above each hole there is an integral projection 22 which is curved back upon itself to form a pivot support for a wing 24 most clearly seen in Fig. 3, this wing is provided with a hole 26 forming a ring member 28 which is received on the projection 22.

Figure 2:
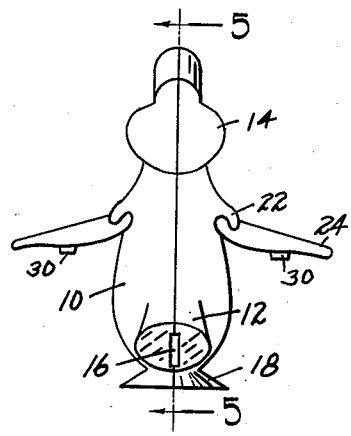
Fig. 2 is a view similar to Fig. 1 but showing the wings extended.
Figure 3:
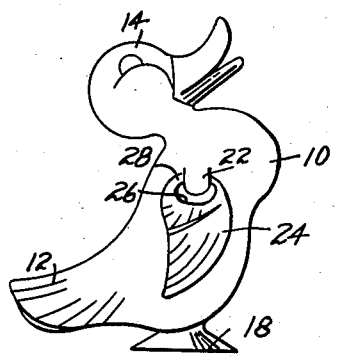
Fig. 3 is a view in side elevation showing the wings down.
Figure 4:
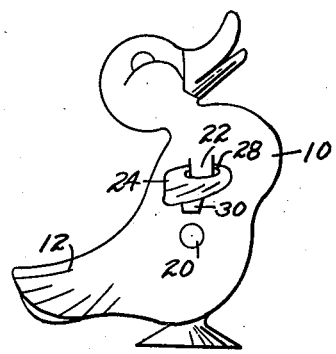
Fig. 4 is a view similar to Fig. 3 showing the wings in their uppermost position.
Figure 5:
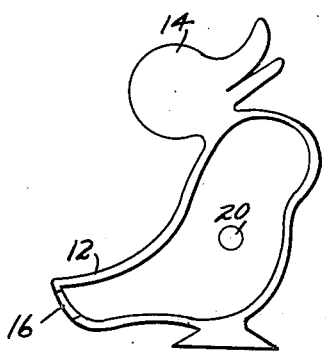
Fig. 5 is a view in elevation of one of the molded halves of the device showing the interior side thereof.

It will be seen that the wings have a pivoted motion from the positions of Figs. 1 and 3 to the positions of Figs. 2 and 4 and that this pivot motion will depend upon the breath being blown in through the tail opening. Therefore, whenever the whistle is blown the wings will rise and depending upon the strength of the breath will depend the extent to which the wings will pivot outwardly away from the body 10. If the breath fails, of course, the wings will drop back and it is, therefore, possible to create the required sound and, at the same time, cause the wings to flutter.

Each wing is provided at its underside with a projection 30, said projection being about the size and shape of the exit holes so as to plug the same when the wings are down to enhance the fluttering action of the wings and also to provide that the wings will receive an initial relatively greater momentum outwardly because of course, the farther outwardly the wings pivot, the greater wind pressure will be required to hold them since the wings pivot outwardly away from the holes.

It will be seen that this invention provides a novel toy whistle and it is emphasized that the whistle apparatus itself may be of any desired conventional construction so that a shrill whistle or imitation of a duck's quack may be produced at the same time the wings flutter.

Having thus described my invention and the advantages thereof, I do not wish to be limited to the details herein disclosed otherwise than as set forth in the claim, but what I claim is:

A whistle or the like in the form of a bird comprising a rigid hollow body having a head and a tail, said body having a breath inlet opening in the tail and an exit opening at each side of the body, a pivoted rigid wing supported just over each opening to normally depend and cover the opening, said wings being pivoted up as the whistle is blown and pivoted down by gravity whenever the breath ceases, and a projection the size and shape of the exit openings at the underside of each wing in position to plug the openings when the wings are down.

ROBERT Y. GRANT, Jr.

REFERENCES CITED

The following references are of record in the file of this patent:

UNITED STATES PATENTS

| Number | Name | Date |
|---|---|---|
| 235,641 | Morris | Dec. 21, 1880 |
| 407,142 | Wobito | July 16, 1889 |
| 897,523 | Cook | Sept. 1, 1908 |
| 1,043,514 | Drexler | Nov. 5, 1912 |
| 1,068,992 | Eddins | July 29, 1913 |
| 1,428,216 | Chase | Sept. 5, 1922 |
| 1,623,168 | Cohn | Apr. 5, 1927 |
| 1,855,527 | Muehlstein | Apr. 26, 1932 |
| 1,977,935 | Caldwell | Oct. 23, 1934 |
| 2,437,024 | Grant | Mar. 2, 1948 |